(12) United States Patent
Funahashi

(10) Patent No.: US 6,980,673 B2
(45) Date of Patent: Dec. 27, 2005

(54) FINGERPRINT IDENTIFICATION SYSTEM, FINGERPRINT IDENTIFICATION APPARATUS, FINGERPRINT IDENTIFICATION METHOD, AND BIOMETRIC IDENTIFICATION APPARATUS

(75) Inventor: Takeshi Funahashi, Saitama (JP)

(73) Assignee: Sony Corporation, (JP)

( * ) Notice: Subject to any disclaimer, the term of this patent is extended or adjusted under 35 U.S.C. 154(b) by 644 days.

(21) Appl. No.: 10/091,294

(22) Filed: Mar. 6, 2002

(65) Prior Publication Data

US 2002/0126882 A1 Sep. 12, 2002

(30) Foreign Application Priority Data

Mar. 7, 2001 (JP) ............................ P2001-062859
Nov. 12, 2001 (JP) ............................ P2001-345719

(51) Int. Cl.$^7$ .............................................. G06K 9/00
(52) U.S. Cl. ........................ 382/124; 340/5.83; 902/3
(58) Field of Search ........................ 382/115, 124–127, 382/209; 356/71

(56) References Cited

U.S. PATENT DOCUMENTS

| | | | | |
|---|---|---|---|---|
| 4,641,350 A | * | 2/1987 | Bunn ........................ | 382/124 |
| 5,067,162 A | * | 11/1991 | Driscoll et al. ............. | 382/126 |
| 5,982,913 A | * | 11/1999 | Brumbley et al. ........... | 382/124 |
| 6,060,756 A | * | 5/2000 | Machida et al. ............. | 257/415 |

FOREIGN PATENT DOCUMENTS

| | | | | |
|---|---|---|---|---|
| EP | 1 054 340 A2 | | 11/2000 | |
| EP | 1239404 A2 | * | 9/2002 | ............ G06K 9/00 |
| JP | 58-176781 | | 10/1983 | |
| JP | 2001-56204 | | 2/2001 | |

OTHER PUBLICATIONS

EPO Search Report mailed Jul. 6, 2005.

* cited by examiner

*Primary Examiner*—Samir Ahmed
*Assistant Examiner*—Charles Kim
(74) *Attorney, Agent, or Firm*—Rader, Fishman & Grauer PLLC; Ronald P. Kananen

(57) ABSTRACT

In a fingerprint identification system, a fingerprint sensor 104 of a registration apparatus 2 reads a fingerprint in a larger region, whereas a fingerprint sensor 30 of an identification apparatus 4, which is smaller in size, reads a fingerprint in a smaller region. When registering a fingerprint, the fingerprint sensor 104 of the registration apparatus 2 reads a fingerprint, and a fingerprint registration circuit 14 generates binary image data based on the fingerprint which has been read. The binary image data is transferred to the identification apparatus 4 and stored in an image memory 16 of the identification apparatus 4. When identifying a fingerprint, the fingerprint sensor 30 of the identification apparatus 4 reads a fingerprint, and a fingerprint identification circuit 32 generates binary image data based on the fingerprint which has been read. Then, the binary image data is compared against the binary image data stored in the image memory 16.

15 Claims, 16 Drawing Sheets

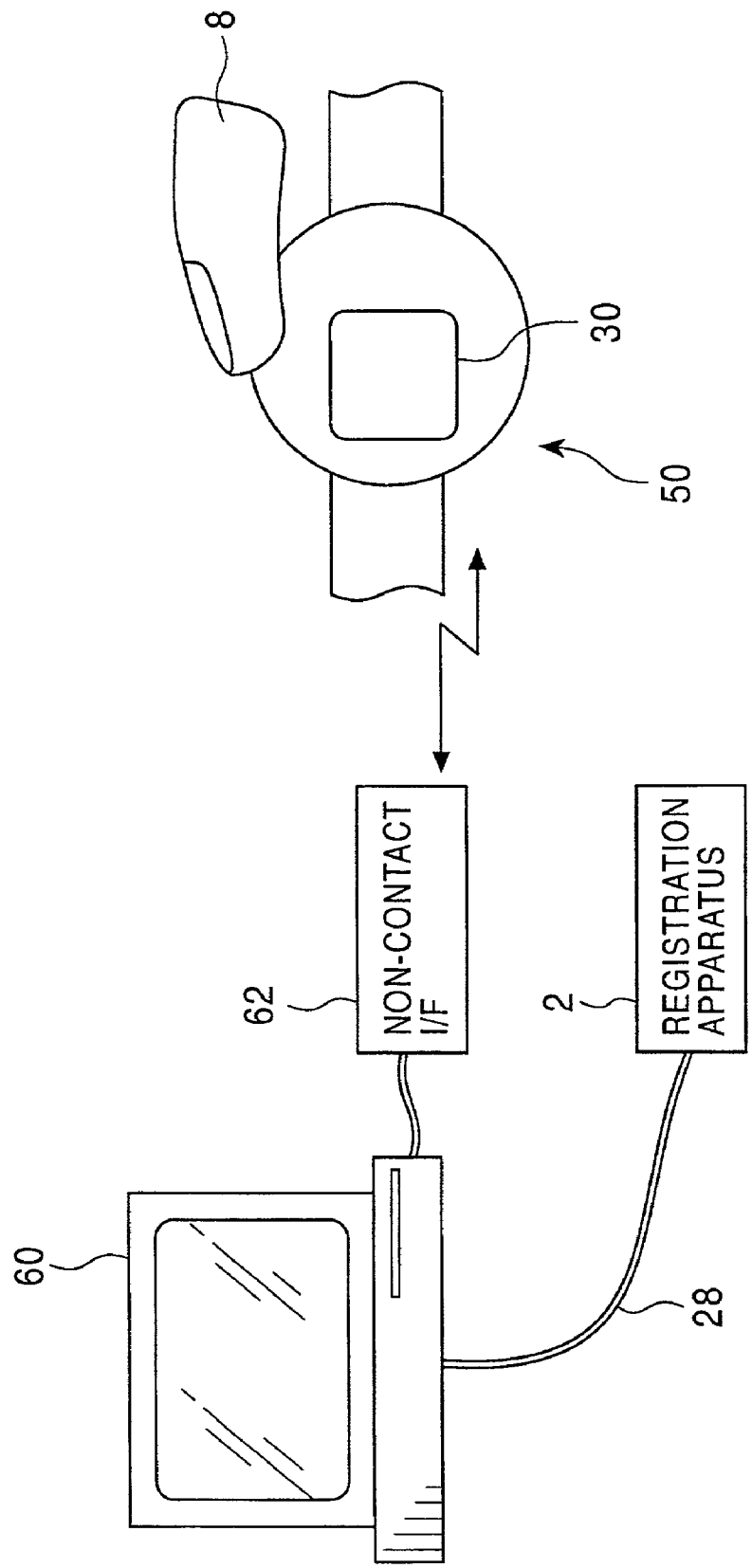

PRIOR ART

FINGERPRINT IDENTIFICATION SYSTEM, FINGERPRINT IDENTIFICATION APPARATUS, FINGERPRINT IDENTIFICATION METHOD, AND BIOMETRIC IDENTIFICATION APPARATUS

BACKGROUND OF THE INVENTION

1. Field of the Invention

The present invention relates to a fingerprint identification system, apparatus, and method for reading a fingerprint from a human finger and comparing the fingerprint against a fingerprint which has been registered in advance, for example, for the purpose of authentication. The present invention also relates to a biometric identification apparatus for reading biometric information relating to a feature of a human body and comparing the biometric information against biometric information which has been registered in advance, for example, for the purpose of authentication.

2. Description of the Related Art

In a system using electronic money, such as electronic commerce on the Internet, user authentication is essential, and fingerprint identification techniques can be used as a means for that purpose.

FIG. 15 is an external view of a conventional fingerprint identification apparatus which is used for such authentication. Referring to FIG. 15, a fingerprint sensor 104 is provided on a surface of a case of a fingerprint identification apparatus 102. A person who is to input his/her fingerprint places his/her finger on a reading unit 108 of the fingerprint sensor 104. Thus, the fingerprint sensor 104 reads the fingerprint, outputting an image signal representing the fingerprint. The fingerprint identification apparatus 102 generates image data of the fingerprint based on the image signal, and analyzes the image data to determine whether the fingerprint which has been read is a particular fingerprint, i.e., whether the person who has input his/her fingerprint is a particular person who has already been registered. For example, a computer (not shown) is notified of the identification result via a cable 110.

Recently, a semiconductor sensor has come to be used as the fingerprint sensor 104, in particular, of the type which detects variation in capacitance due to ridges and valleys of the fingerprint of a finger placed on the fingerprint reading unit 108 (e.g., Japanese Unexamined Patent Application Publication No. 2001-056204).

With regard to methods of fingerprint identification, minutiae method which uses data relating to feature points such as bifurcations and ridge endings of a fingerprint, pattern matching method which compares binarized image data, and a method which performs identification based on the cycle of ridges and valleys of a fingerprint have hitherto been known.

Among them, pattern matching method uses a relatively simple algorithm, and is therefore suitable to implement a fingerprint identification circuit by an LSI (large scale integration circuit), which is advantageous in reducing cost of the apparatus and improving processing speed.

When a fingerprint is identified by pattern matching (e.g., Japanese Unexamined Patent Application Publication No. 58-176781), grayscale image data of the fingerprint is first binarized, and then compared against template image data which has been stored in advance.

Hitherto, in pattern matching method, assuming that features of a fingerprint exists mainly in the central portion thereof, template image data has usually been created and stored by extracting image data representing only the central portion of the fingerprint. At the time of identification, an image representing a larger region of a fingerprint which has been read by a fingerprint sensor at the time of identification, shown in FIG. 16A, is compared against the template image representing a smaller region of a fingerprint, shown in FIG. 16B.

The fingerprint sensor of the type which detects capacitance is relatively expensive. Furthermore, the fingerprint sensor has a large number of cells (elements) for detecting capacitance, and thus is more expensive as the size increases. Accordingly, it is effective to reduce cost of the fingerprint sensor, particularly to use a fingerprint sensor of a smaller size with a smaller number of elements, in order to reduce cost of the fingerprint identification apparatus.

However, if a fingerprint sensor having a smaller number of elements and therefore having a smaller reading region is used, the region of a fingerprint which is read at the time of identification does not necessarily coincide with the region of a fingerprint which has been stored as a template, inhibiting fingerprint identification, and thus causing the inconvenience that a person who is to input his/her fingerprint is required to let his/her finger be read many times.

SUMMARY OF THE INVENTION

The present invention has been made in order to overcome the problems described above, and it is an object of the present invention to provide a fingerprint identification system, a fingerprint identification apparatus, and a fingerprint identification method in which a fingerprint sensor of a small size is used so as to achieve reduction in cost while maintaining performance of fingerprint identification.

Furthermore, it is another object of the present invention to provide a biometric identification apparatus in which a biometric sensor of a small size is used so as to achieve reduction in cost while maintaining performance of biometric identification.

To these ends, the present invention, in one aspect thereof, provides a fingerprint identification system including a registration apparatus and an identification apparatus. The registration apparatus includes a first fingerprint sensor for reading a fingerprint in a first region of a human finger to output an image signal representing an image of the fingerprint; a first image data generating unit for generating image data of the fingerprint based on the image signal output from the first fingerprint sensor; and a data output unit for outputting the image data generated by the first image data generating unit. The identification apparatus includes a data input unit for receiving the image data output from the data output unit; a storage unit for storing the image data received by the data input unit; a second fingerprint sensor for reading a fingerprint in a second region of a human finger, which is smaller than the first region, to output an image signal representing an image of the fingerprint; a second image data generating unit for generating image data of the fingerprint based on the image signal output from the second fingerprint sensor; and an image identification unit for comparing the image data generated by the second image data generating unit against the image data stored in the storage unit to determine whether the fingerprints represented by the respective image data coincide with each other.

According to the fingerprint identification system, when registering a fingerprint, a person who is to register his/her fingerprint places his/her finger on a fingerprint reading unit of the first fingerprint sensor of the registration apparatus. The first fingerprint sensor reads the fingerprint in the first region of the finger to output an image signal representing the fingerprint. The first image data generating unit generates image data of the fingerprint based on the image signal output from the first fingerprint sensor, and the data output unit outputs the image data generated by the first image data generating unit. In the identification apparatus, the data input unit receives the image data output from the data output unit, and the image data is stored in the storage unit.

When identifying a fingerprint, a person who is to input his/her fingerprint places his/her finger on a fingerprint reading unit of the second fingerprint sensor of the identification apparatus. The second fingerprint sensor reads the fingerprint in the second region of the finger to output an image signal representing the fingerprint. The second image data generating unit generates image data of the fingerprint based on the image signal output from the second fingerprint sensor. The image identification unit compares the image data generated by the second image data generating unit against the image data stored in the storage unit to determine whether the fingerprints represented by the respective image data coincide with each other.

As described above, according to the fingerprint identification system, when registering a fingerprint, the fingerprint is read in a larger region (the first region) by the first fingerprint sensor of the registration apparatus to generate image data; whereas when identifying a fingerprint, the fingerprint is read in a smaller region (the second region) by the second fingerprint sensor of the identification apparatus to generate image data. The image identification unit compares the respective image data to determine whether the fingerprints coincide with each other.

Thus, even though the reading region for the second fingerprint sensor is smaller and the image data associated with the second fingerprint sensor only represents the fingerprint in the smaller region, the image data associated with the first fingerprint sensor represents the fingerprint in the larger region, so that accurate fingerprint identification is constantly achieved.

In addition, the second fingerprint sensor has a smaller reading region and thus can be implemented at a lower cost with a smaller number of elements, serving to achieve reduction in cost of an identification apparatus. The cost reduction is extremely advantageous because an identification apparatus is usually owned by each user. Furthermore, since the second fingerprint sensor has a smaller reading region with a smaller number of elements, the fingerprint identification apparatus can be readily incorporated in various portable items, allowing fingerprint identification anytime when required.

The present invention, in another aspect thereof, provides a fingerprint identification apparatus including a storage unit for storing image data representing an image of a fingerprint in a first region of a human finger; a fingerprint sensor for reading a fingerprint in a second region of a human finger, which is smaller than the first region, to output an image signal representing an image of the fingerprint; an image data generating unit for generating image data of the fingerprint based on the image signal output from the fingerprint sensor; and an image identification unit for comparing the image data generated by the image data generating unit against the image data stored in the storage unit to determine whether the fingerprints represented by the respective image data coincide with each other. Furthermore, an input unit for inputting fingerprint data in the first region to the fingerprint identification apparatus may be provided.

According to the fingerprint identification apparatus, when identifying a fingerprint, a person who is to input his/her fingerprint places his/her finger on a fingerprint reading unit of the fingerprint sensor of the identification apparatus. The fingerprint sensor reads the fingerprint in the second region of the finger to output an image signal representing the fingerprint. The image data generating unit generates image data of the fingerprint based on the image signal output from the fingerprint sensor. The image identification unit compares the image data generated by the image data generating unit against the image data stored in the storage unit to determine whether the fingerprints represented by the respective image data coincide with each other.

As described above, according to the fingerprint identification apparatus, when registering a fingerprint, the fingerprint is read in a larger region (the first region) by a fingerprint sensor of a registration apparatus to generate image data; whereas when identifying a fingerprint, the fingerprint is read in a smaller region (the second region) by the fingerprint sensor of the identification apparatus to generate image data. The image identification unit compares the respective image data to determine whether the fingerprints coincide with each other.

Thus, even though the reading region for the fingerprint sensor of the identification apparatus is smaller and the image data associated with the fingerprint sensor of the identification apparatus only represents the fingerprint in the smaller region, the image data associated with the fingerprint sensor of the registration apparatus represents the fingerprint in the larger region, so that accurate fingerprint identification is constantly achieved.

In addition, the fingerprint sensor of the identification apparatus has a smaller reading region and thus can be implemented at a lower cost with a smaller number of elements, serving to achieve reduction in cost of an identification apparatus. The cost reduction is extremely advantageous because an identification apparatus is usually owned by each user. Furthermore, since the fingerprint sensor of the identification apparatus has a smaller reading region with a smaller number of elements, the fingerprint identification apparatus can be readily incorporated in various portable items, allowing fingerprint identification anytime when required.

The present invention, in yet another aspect thereof, provides a fingerprint identification method including a registration apparatus controlling step and an identification apparatus controlling step. The registration apparatus controlling step includes a first image signal output step for reading a fingerprint in a first region of a human finger by a first fingerprint sensor to output an image signal representing an image of the fingerprint; a first image data generating step for generating image data of the fingerprint based on the image signal output in the first image signal output step; and a data output step for outputting the image data generated in the first image data generating step. The identification apparatus controlling step includes a data input step for receiving the image data output in the data output step; a storing step for storing the image data received in the data input step in a storage unit; a second image signal output step for reading a fingerprint in a second region of a human finger, which is smaller than the first region, by a second fingerprint sensor to output an image signal representing an image of the fingerprint; a second image data generating step for generating image data of the fingerprint based on the image signal output in the second image signal output step; and an image identification step for comparing the image data generated in the second image data generating step against the image data stored in the storage unit to determine whether the fingerprints represented by the respective image data coincide with each other.

According to the fingerprint identification method, when registering a fingerprint, a person who is to register his/her fingerprint places his/her finger on a fingerprint reading unit of the first fingerprint sensor of the registration apparatus. In the first image signal output step, the fingerprint in the first region of the finger is read to output an image signal representing the fingerprint. In the first image data generating step, image data of the fingerprint is generated based on the image signal output in the first image signal output step, and in the data output step, the image data generated in the first image data generating step is output. In the identification apparatus, the image data output in the data output step is received in the data input step, and in the storing step, the image data is stored in the storage unit.

When identifying a fingerprint, a person who is to input his/her fingerprint places his/her finger on a fingerprint reading unit of the second fingerprint sensor of the identification apparatus. In the second image signal output step, the fingerprint in the second region of the finger is read to output an image signal representing the fingerprint. In the second image data generating step, image data of the fingerprint is generated based on the image signal output in the second image signal output step. In the image identification step, the image data generated in the second image data generating step is compared against the image data stored in the storage unit to determine whether the fingerprints represented by the respective image data coincide with each other.

As described above, according to the fingerprint identification method, when registering a fingerprint, the fingerprint is read in a larger region (the first region) by the first fingerprint sensor of the registration apparatus to generate image data; whereas when identifying a fingerprint, the fingerprint is read in a smaller region (the second region) by the second fingerprint sensor of the identification apparatus to generate image data. The image identification unit compares the respective image data to determine whether the fingerprints coincide with each other.

Thus, even though the reading region for the second fingerprint sensor is smaller and the image data associated with the second fingerprint sensor only represents the fingerprint in the smaller region, the image data associated with the first fingerprint sensor represents the fingerprint in the larger region, so that accurate fingerprint identification is constantly achieved.

In addition, the second fingerprint sensor has a smaller reading region and thus can be implemented at a lower cost with a smaller number of elements, serving to achieve reduction in cost of an identification apparatus. The cost reduction is extremely advantageous because an identification apparatus is usually owned by each user. Furthermore, since the second fingerprint sensor has a smaller reading region with a smaller number of elements, the fingerprint identification apparatus can be readily incorporated in various portable items, allowing fingerprint identification anytime when required.

The present invention, in another aspect thereof, provides a fingerprint identification method including a storing step for storing in a storage unit image data representing an image of a fingerprint in a first region of a human finger; an image signal output step for reading a fingerprint in a second region of a human finger, which is smaller than the first region, by a fingerprint sensor to output an image signal representing an image of the fingerprint; an image data generating step for generating image data of the fingerprint based on the image signal output in the image signal output step; and an image identification step for comparing the image data generated in the image data generating step against the image data stored in the storage unit to determine whether the fingerprints represented by the respective image data coincide with each other.

The present invention, in still another aspect thereof, provides a biometric identification apparatus including a storage unit for storing image data representing an image of biometric information in a first region of a human body; a biometric sensor for reading biometric information in a second region of a human body, which is smaller than the first region, to output an image signal representing an image of the biometric information; an image data generating unit for generating image data of the biometric information based on the image signal output from the biometric sensor; and an image identification unit for comparing the image data generated by the image data generating unit against the image data stored in the storage unit to determine whether the biometric information represented by the respective image data coincide with each other. Furthermore, an input unit for inputting biometric information data in the first region to the biometric identification apparatus may be provided.

According to the biometric identification apparatus, when identifying biometric information, a person who is to input his/her biometric information lets a biometric information reading unit of the biometric sensor of the identification apparatus read the biometric information. The second biometric sensor reads the biometric information in the second region of the person to output an image signal representing the biometric information. The image data generating unit generates image data of the biometric information based on the image signal output from the biometric sensor. The image identification unit compares the image data generated by the image data generating unit against the image data stored in the storage unit to determine whether the biometric information represented by the respective image data coincide with each other.

As described above, according to the biometric identification apparatus, when registering biometric information, the biometric information is read in a larger region (the first region) by a biometric sensor of a registration apparatus to generate image data; whereas when identifying biometric information, the biometric information is read in a smaller region (the second region) by the biometric sensor of the identification apparatus to generate image data. The image identification unit compares the image data associated with the biometric information which has been read in the smaller region (the second region) against the image data associated with the biometric information which has been read in the larger region (the first region), thereby determining whether the biometric information coincide with each other.

Thus, even though the reading region for the biometric sensor of the identification apparatus is smaller and the image data associated with the biometric sensor of the identification apparatus only represents the biometric information in the smaller region, the image data associated with the biometric sensor of the registration apparatus represents the biometric information in the larger region, so that accurate biometric identification is constantly achieved.

In addition, the biometric sensor of the identification apparatus has a smaller reading region and thus can be implemented at a lower cost with a smaller number of elements, serving to achieve reduction in cost of an identification apparatus. The cost reduction is extremely advantageous because an identification apparatus is usually owned by each user. Furthermore, since the biometric sensor of the identification apparatus has a smaller reading region with a smaller number of elements, the biometric identification apparatus can be readily incorporated in various portable items, allowing biometric identification anytime when required.

BRIEF DESCRIPTION OF THE DRAWINGS

FIG. 12 is an illustration showing the configuration of a fingerprint identification system according to the third embodiment;

DESCRIPTION OF THE PREFERRED EMBODIMENTS

Preferred embodiments of fingerprint identification system, fingerprint identification method and identification apparatus, and biometric identification apparatus will now be described with reference to the accompanying drawings.

Figure 1A:
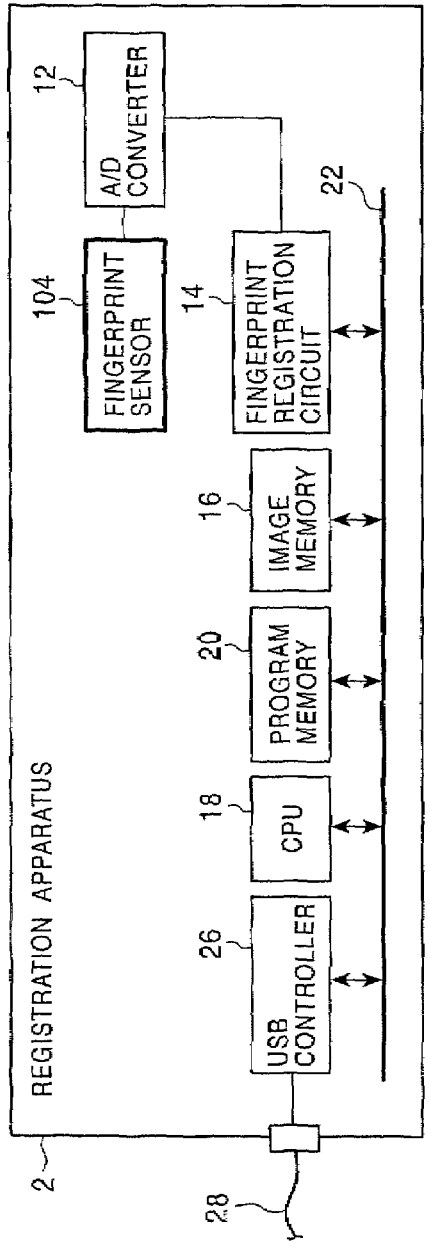
FIGS. 1A and 1B are block diagrams of a registration apparatus and an identification apparatus constituting a fingerprint identification system according to a first embodiment of the present invention, respectively.
Figure 1B:
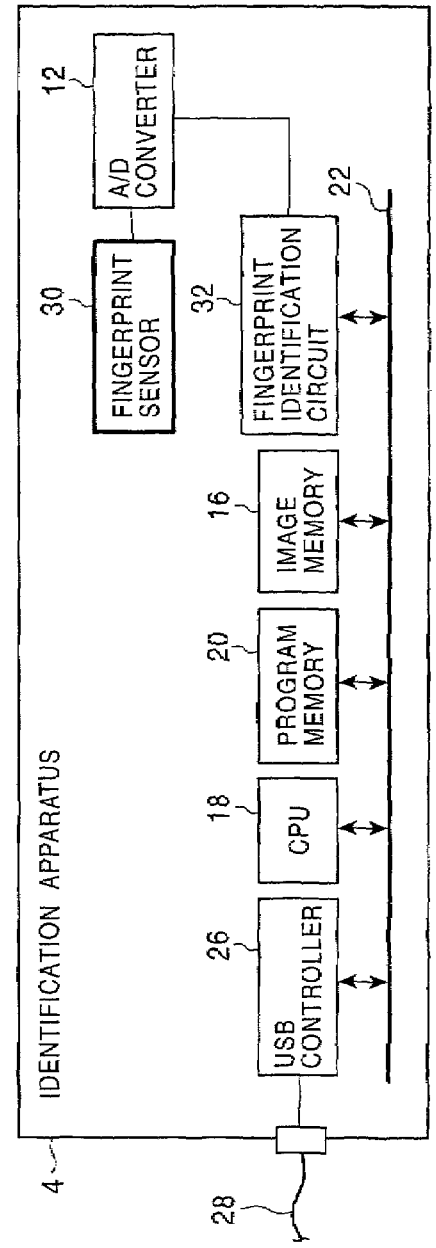
Figure 2:
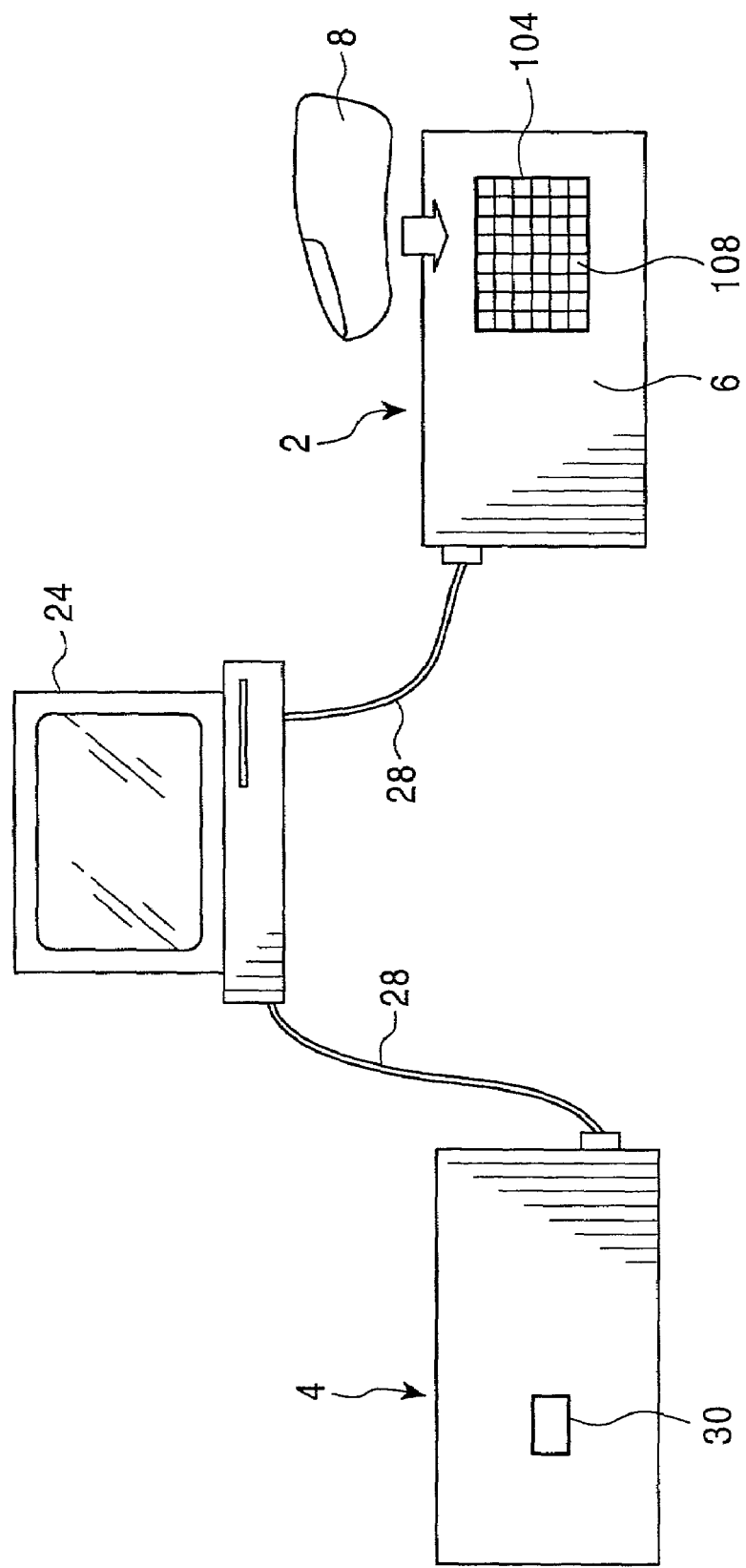
FIG. 2 is a diagram showing the system configuration for fingerprint registration.
Figure 3:
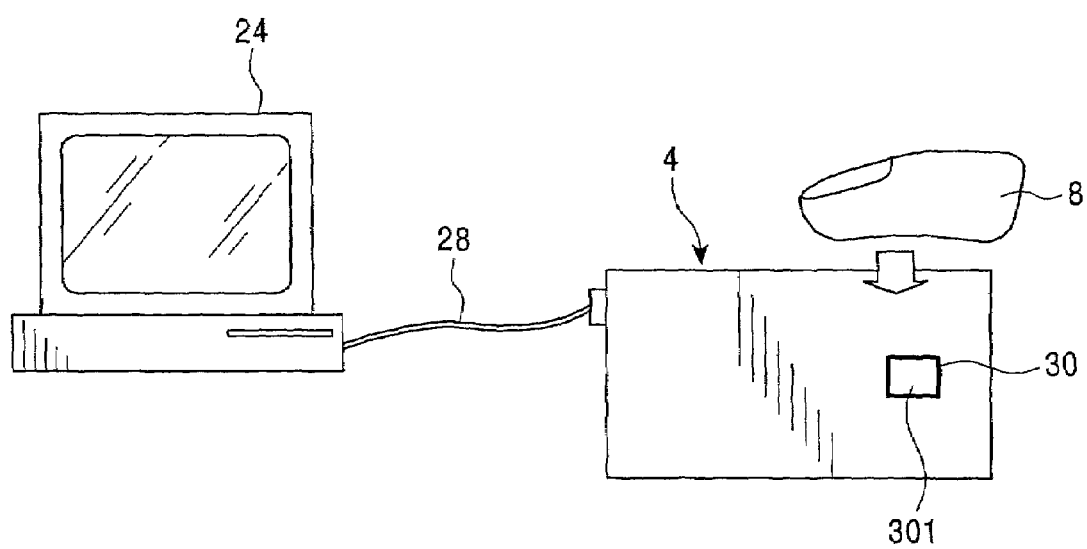
FIG. 3 is a diagram showing the system configuration for fingerprint identification.

FIGS. 1A and 1B are block diagrams of a registration apparatus and an identification apparatus constituting a fingerprint identification system according to a first embodiment of the present invention, respectively. FIG. 2 is a diagram showing the system configuration for fingerprint registration, and FIG. 3 is a diagram showing the system configuration for fingerprint identification.

The fingerprint identification system according to the first embodiment includes a registration apparatus 2 and an identification apparatus 4 shown in FIGS. 1A and 1B.

The registration apparatus 2 has a fingerprint sensor 104 disposed on a surface of a case 6, as shown in FIG. 2. The fingerprint sensor 104 is implemented by a semiconductor sensor which detects variation in capacitance due to ridges and valleys of a fingerprint when a finger 8 is placed on a fingerprint reading unit 108 and which outputs an electric image signal representing the fingerprint. The fingerprint sensor 104 reads a fingerprint in a region (a first region) which is large enough to cover substantially the entire fingerprint of a finger at once, as in the case with the related art.

More specifically, as shown in FIG. 1A, the registration apparatus 2 further includes an A/D converter 12, a fingerprint registration circuit 14, an image memory 16, a CPU (central processing unit) 18, and a program memory 20.

The A/D converter 12 digitizes the image signal of the fingerprint output by the fingerprint sensor 104, and outputs image data representing a grayscale image of the fingerprint.

The fingerprint registration circuit 14 is implemented, for example, by an LSI. The fingerprint registration circuit 14 generates, based on the image data from the A/D converter 12, binary image data which serves as registration image data representing a binary image of the fingerprint, and stores the registration image data in the image memory 16 which is implemented, for example, by a rewritable, non-volatile memory, via a bus line 22.

The A/D converter 12 and the fingerprint registration circuit 14 constitute first image data generating means according to the present invention.

The program memory 20 includes a RAM (random access memory) and a ROM (read-only memory). The CPU 18 fetches a program stored in the ROM via the bus line 22, and operates according to the program using the RAM as required, thereby exercising overall control on the registration apparatus 2.

A USB (Universal Serial Bus) controller 26 is connected to the bus line 22, and it functions as an interface for connecting the registration apparatus 2 to a computer 24 (shown in FIG. 2) via a USB cable 28. The computer 24 may be, for example, a personal computer.

The CPU 18, together with the USB controller 26, constitutes data output means according to the present invention, and it outputs the registration image data stored in the image memory 16 to the computer 24 via the bus line 22, the USB controller 26, and the USB cable 28.

The identification apparatus 4 is constructed similarly to the registration apparatus 2, but the fingerprint sensor 104 and the fingerprint registration circuit 14 are replaced with a fingerprint sensor 30 and a fingerprint identification circuit 32. In FIG. 1B, parts that are identical to those in FIG. 1A are designated by the same numbers, and descriptions thereof will be omitted.

The fingerprint sensor 30 is implemented by a semiconductor sensor which detects variation in capacitance due to ridges and valleys of a fingerprint and which outputs an electric image signal representing the fingerprint, similarly to the fingerprint sensor 104; however, the fingerprint sensor 30 reads a fingerprint in a region (a second region) which is smaller than the reading region for the fingerprint sensor 104, for example, on the order of a quarter. Thus, the fingerprint sensor 30 usually reads only a portion of a fingerprint.

Furthermore, in the identification apparatus 4, the fingerprint identification circuit 32, which is provided in place of the fingerprint registration circuit 14, is implemented, for example, by an LSI. The fingerprint identification circuit 32, together with the A/D converter 12, constitutes second image data generating means according to the present invention, and it also constitutes image identification means. More specifically, the fingerprint identification circuit 32 generates, based on the image data from the A/D converter 12, binary image data which serves as input image data representing a binary image of the fingerprint. Furthermore, the fingerprint identification circuit 32 compares, by pattern matching, the input image data against the registration image data of a fingerprint which is received from the registration apparatus 2 and stored in the image memory 16 in advance, thereby determining whether the fingerprints represented by the respective binary image data coincide with each other.

In the identification apparatus 4, the CPU 18 constitutes data input means together with the USB controller 26, and it receives the registration image data of a fingerprint from the registration apparatus 2 via the USB cable 28, and stores the registration image data in the image memory 16 (storage means according to the present invention).

In this embodiment, a fingerprint is used as biometric information representing a biometric feature of an individual user. Furthermore, the fingerprint sensor 104 constitutes a first biometric sensor according to the present invention and the fingerprint sensor 30 constitutes a second biometric sensor according to the present invention.

Figure 5:
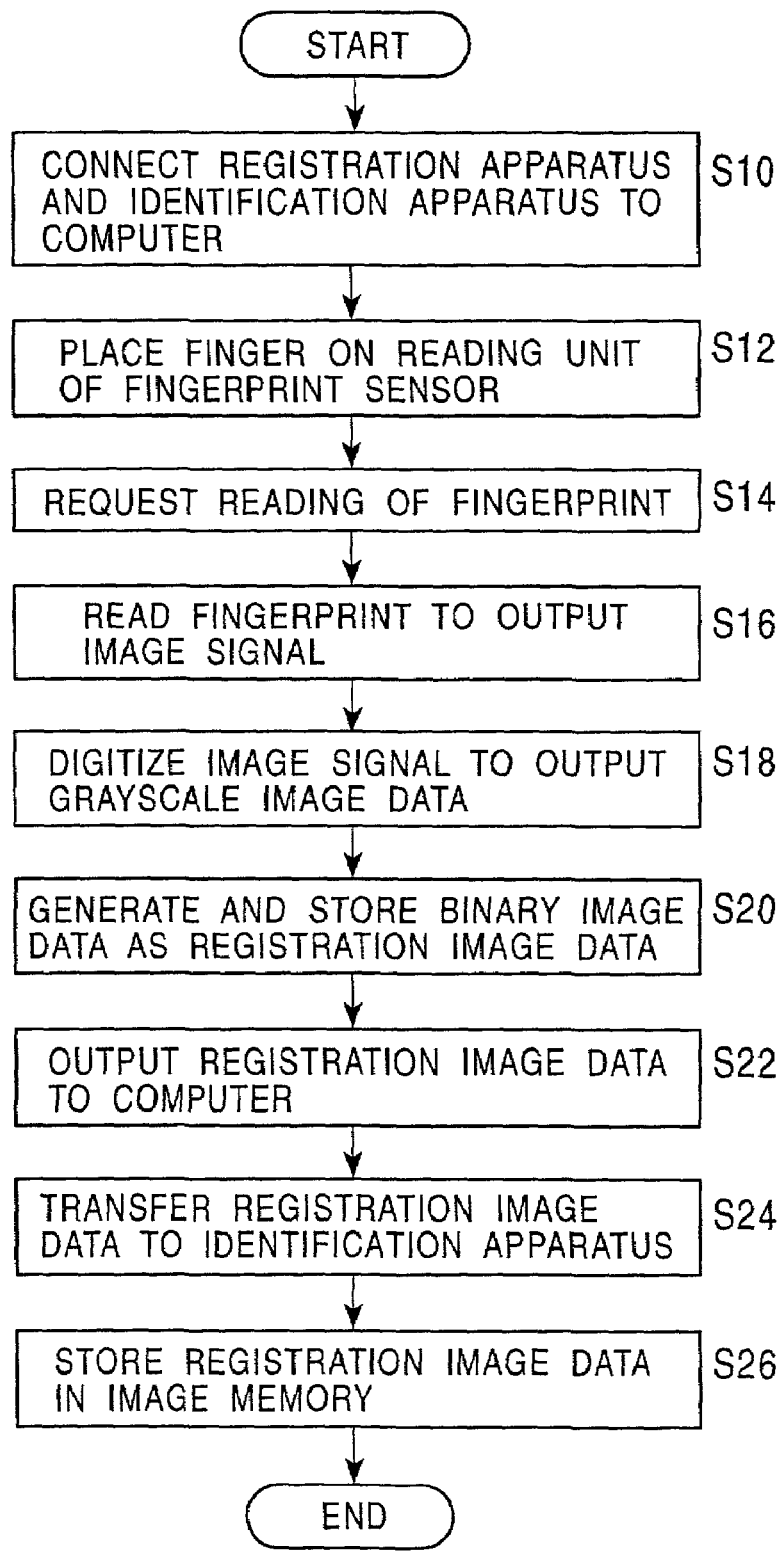
FIG. 5 is a flowchart of a fingerprint registration operation according to the first embodiment.

Next, an operation for registering a fingerprint in the fingerprint identification system constructed as described above will be described with reference to a flowchart shown in FIG. 5.

When registering a fingerprint, the registration apparatus 2 and the identification apparatus 4 are connected to the computer 24 via the USB cable 28 (step S10), as shown in FIG. 2.

Then, a person who is to register his/her fingerprint places his/her finger on the reading unit 108 of the fingerprint sensor 104 in the registration apparatus 2 (step S12). An operator of the computer 24 performs a predetermined operation on the computer 24, requesting the registration apparatus 2 to read the fingerprint (step S14).

Thus, the fingerprint sensor 104 reads the fingerprint of substantially the entire finger placed on the reading unit 108, and outputs an image signal of the fingerprint (step S16). The A/D converter 12 (shown in FIG. 1A) digitizes the image signal to output a grayscale image data (step S18).

Figure 4A:
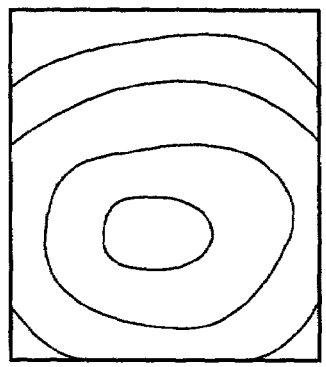
FIGS. 4A and 4B are illustrations showing examples of fingerprint images represented by binary image data generated in the system shown in FIGS. 1A and 1B.
Figure 4B:
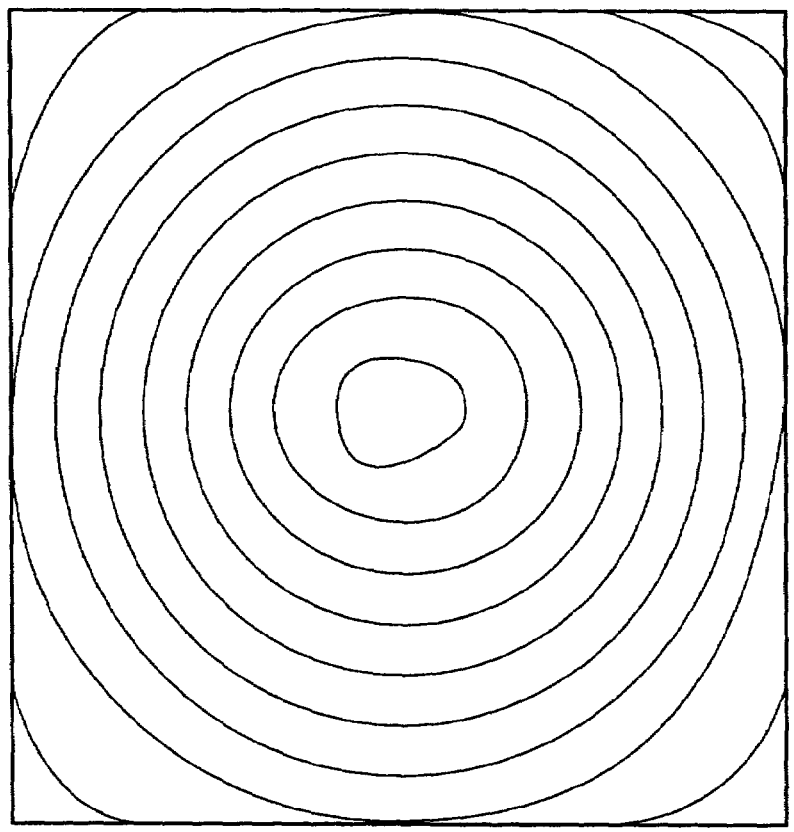

The fingerprint registration circuit 14 binarizes the grayscale image data received from the A/D converter 12, thus generating binary image data which serves as registration image data of the fingerprint, and it stores the registration image data in the image memory 16 (step S20). The image represented by the registration image data stored in the image memory 16 is, for example, as shown in FIG. 4B.

Then, the CPU 18 reads the registration image data of the fingerprint from the image memory 16, and outputs the registration image data to the computer 24 via the USB controller 26 and the USB cable 28 (step S22). The computer 24 transfers the registration image data to the identification apparatus 4 via the USB cable 28 (step S24).

The CPU 18 of the identification apparatus 4 (shown in FIG. 1B) receives the registration image data via the USB cable 28 and the USB controller 26, and stores the registration image data in the image memory 16 (step S26).

Figure 6:
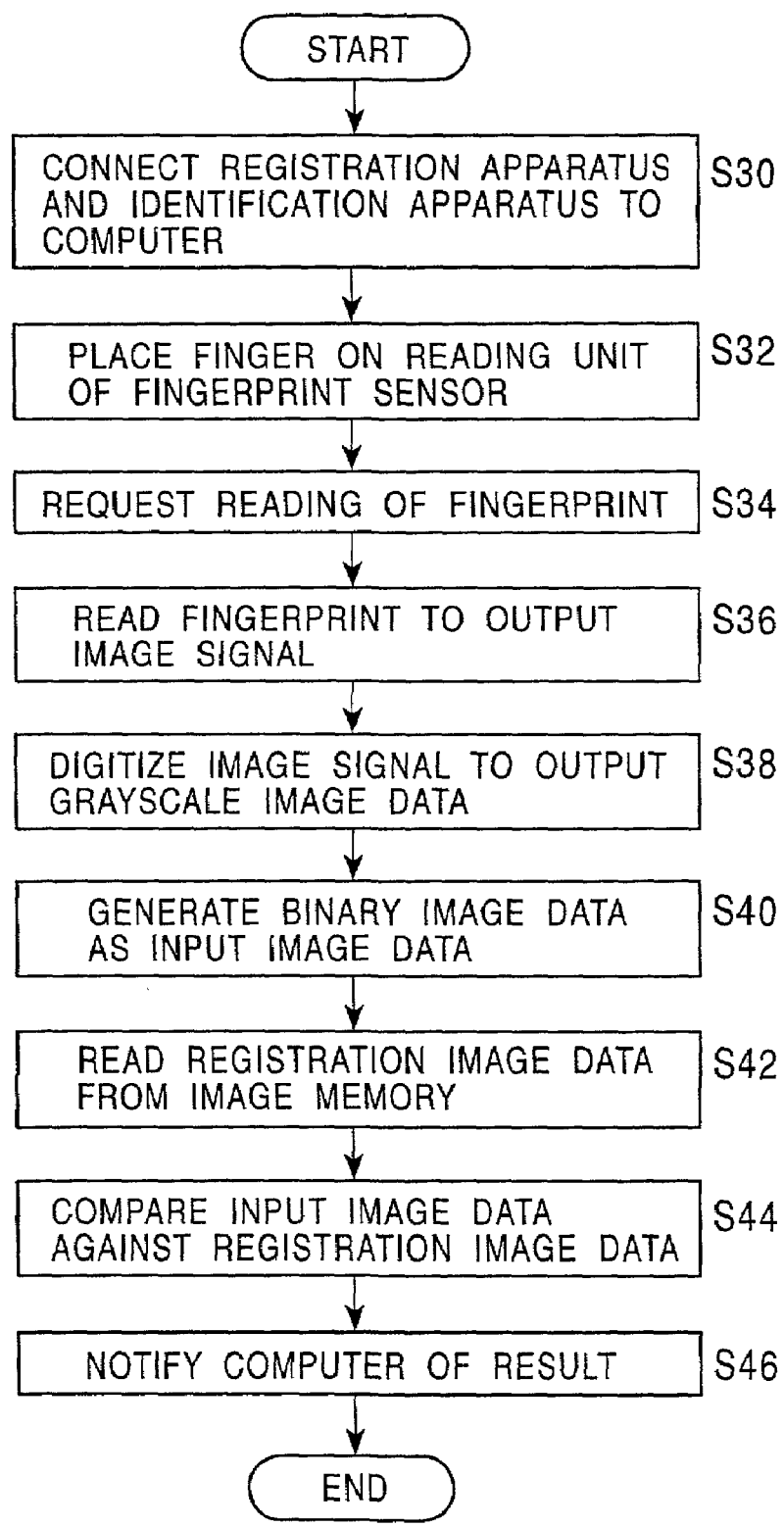
FIG. 6 is a flowchart of a fingerprint identification operation according to the first embodiment.

Next, an operation for identifying a fingerprint will be described with reference to a flowchart shown in FIG. 6.

When identifying a fingerprint, the identification apparatus 4 is connected to the computer 24 via the USB cable 28 (step S30), as shown in FIG. 3.

Then, a person who is to input his/her fingerprint places his/her finger on a reading unit 301 of the fingerprint sensor 30 (step S32). An operator of the computer 24 performs a predetermined operation on the computer 24, requesting the identification apparatus 4 to read the fingerprint via the computer 24 (step 34).

Thus, the fingerprint sensor 30 reads the fingerprint of a part of the finger placed on the reading unit 301, outputting an image signal representing the fingerprint (step S36). The A/D converter digitizes the image signal to output grayscale image data (step S38).

The fingerprint identification circuit 32 binarizes the grayscale image data received from the A/D converter 21, thus generating binary image data which serves as input image data of the fingerprint (step S40). The image represented by the input image data generated by the fingerprint identification circuit 32 based on the data form the A/D converter 12 shows only a part of the fingerprint, as shown in FIG. 4A.

The fingerprint identification circuit 32 reads the registration image data stored in advance in the image memory 16 as described earlier (step S42), and compares, by pattern matching, the input image data which has been newly generated based on the data from the A/D converter 12 against the registration image data which has been read, thereby determining whether the fingerprints represented by the respective image data coincide with each other on the basis of a particular criterion (step S44).

The input image data represents only a part of the fingerprint as described earlier (shown in FIG. 4A), whereas the registration image data stored in the image memory 16 represents substantially the entire fingerprint (shown in FIG. 4B); accordingly, the fingerprint identification circuit 32 performs pattern matching while moving the position of the image represented by the input image data over the entire image represented by the registration image data.

The CPU 18 of the identification apparatus 4 is notified of the identification result via the bus line 22, and the CPU 18 notifies the computer 24 of the identification result via the USB controller 26 and the USB cable 28 (step S46).

As described above, according to this embodiment, the fingerprint sensor 30 of the identification apparatus 4 covers a smaller region and thus input image data to be identified is acquired only from the smaller region; whereas the fingerprint sensor 104 of the registration apparatus 2 covers a larger region so that registration image data is acquired from the larger region.

Thus, even if input image data to be identified is acquired only from the smaller region and if the data misses the central portion of the fingerprint, the fingerprint identification circuit 32 constantly compares the respective image data with accuracy, successfully determining whether the fingerprints represented by the respective image data coincide with each other.

Furthermore, since the fingerprint sensor 30 reads a fingerprint in the smaller region, the fingerprint sensor 30 can be implemented at a lower cost with a smaller number of elements, serving to reduce cost of the identification apparatus 4. Since the identification apparatus 4 is owned by each user, reduction in cost thereof is extremely advantageous.

More specifically, cost of the registration apparatus 2 remains the same as in the related art since a fingerprint sensor with a larger reading region is used, and cost of the system as a whole increases because the registration apparatus 2 and the identification apparatus 4 are separately provided. However, since each user is not required to own the registration apparatus 2 individually and is required only to own the identification apparatus 4, reduction in cost of the identification apparatus 4 is extremely advantageous.

Furthermore, the small fingerprint sensor 30 can be suitably incorporated in portable electronic apparatuses such as cellular phones. Thus, for example, a cellular phone with a fingerprint identification function, which serves as the identification apparatus 4, can be readily implemented.

Figure 7:
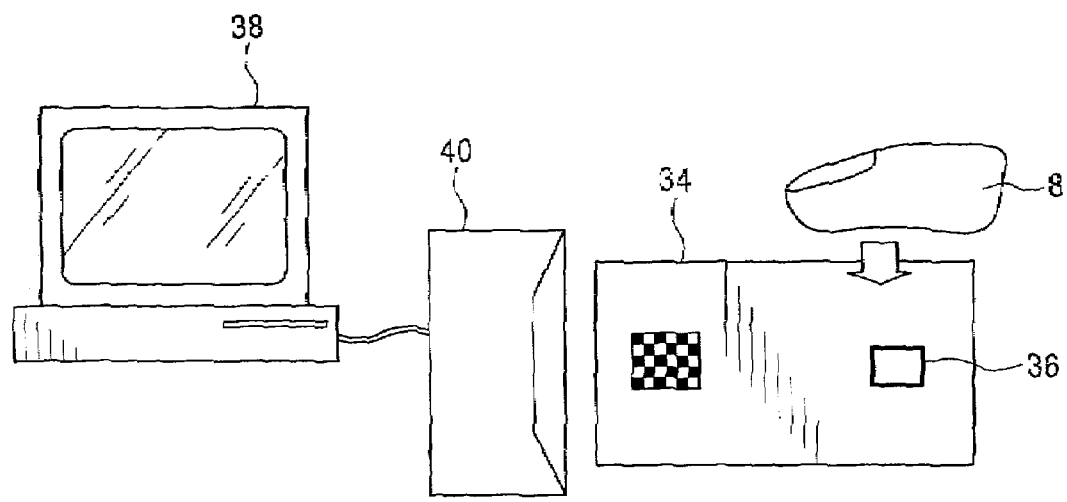
FIG. 7 is a diagram showing the configuration of an example of a smart card (IC card) system using a smart card (IC card) incorporating a fingerprint sensor.

Furthermore, owing to the smaller size of the fingerprint sensor 30, the identification apparatus 4 can be readily implemented in the form of a smart card (IC card) (an example of portable item in Claims) with a fingerprint sensor for identification. FIG. 7 is a diagram showing the configuration of an example of a smart card (IC card) system in which a smart card (IC card) incorporating such a fingerprint sensor is used. In the system, as shown in FIG. 7, a smart card (IC card) 34 incorporates a fingerprint sensor 36 which is equivalent to the fingerprint sensor 30. The fingerprint sensor 36 reads a fingerprint in order to authenticate the user of a card. Only if the user is found to be a legitimate user, a computer 38 is allowed to exchange data with the smart card 34 via a card reader 40. As opposed to currently used smart cards (IC cards) which allow personal authentication only by use of a password, the fingerprint identification system according to this embodiment serves to implement a highly secure smart card (IC card) system.

Furthermore, smart cards (IC cards) easily bend, and a large fingerprint sensor is more likely to be affected by bending and thus damaged. In contrast, the present invention is advantageous in that a fingerprint sensor of a smaller size is used.

The registration apparatus 2 is typically prepared by the issuer of the smart card 34, and provided, for example, at a registration center together with a card reader which is also capable of writing, so that when the smart card 34 is issued, the fingerprint of the user of the smart card 34 is read by the registration apparatus 2 and registered via the card reader in the smart card 34 which serves as the registration apparatus 4.

These techniques can be applied to smart cards (IC cards) for various applications, such as driving licenses, passports, credit cards, etc.

Furthermore, obviously, application of the present invention is not limited to smart cards (IC cards). For example, since an identification apparatus can be readily implemented in a small size, a key to home or office, a key of a car, etc. may be implemented as an identification apparatus according to the present invention. In that case, the key can be implemented with a wireless interface, and only a legitimate user of the key is allowed to use the key based on fingerprint identification.

Although the binary image data generated by the registration apparatus 2 is directly output to the identification apparatus 4 via the computer 24 in this embodiment, advantageously, the binary image data may be encrypted before being output to the computer 24, which serves to avoid security concerns associated with the computer 24 on route. The encryption may be performed based on, for example, a public key encryption method.

Furthermore, when the binary image data from the registration apparatus 2 is stored in the image memory 16 in the identification apparatus 4, advantageously, the binary image data may be encrypted before being stored in the image memory 16, which further enhances security.

The binary image data generated by the registration apparatus 2 need not necessarily be stored in the image memory 16 of the identification apparatus 4 in advance. Alternatively, the binary image data generated by the registration apparatus 2 may be stored in a server connected to a communication network or in a computer, and transferred to the registration apparatus 2 via the network or from the computer and stored in the image memory 16 at the time of fingerprint identification.

Furthermore, although the binary image data of a fingerprint registered in the registration apparatus 2 is transferred to the identification apparatus 4 via the computer 24 in this embodiment, the registration apparatus 2 and the identification apparatus 4 may be connected without a computer, a network, etc. in the middle so that the binary image data will be transferred directly. In this case, fingerprint information is not passed to any system other than the registration apparatus 2 and the identification apparatus 4. Thus, the fingerprint information is prevented from being stolen or interpolated, which serves to achieve improved security.

Although the registration apparatus 2 is used only for registration of a fingerprint in this embodiment, advantageously, the registration apparatus 2 may also have a fingerprint identification function so that a fingerprint can also be identified based on data acquired by the fingerprint sensor 104.

Furthermore, although the registration apparatus 2 and the identification apparatus 4 are connected by USB, for example, to a computer, the registration apparatus 2 and the identification apparatus 4 may also be connected to a computer, etc. based on, for example, RS232C standard.

Next, a second embodiment will be described.

The second embodiment differs from the first embodiment in that when identifying a fingerprint, the fingerprint sensor 104 reads a fingerprint a plurality of times to acquire a plurality of input image data, so that the plurality of input image data are compared against registration image data.

Accordingly, the image memory 16 of the identification apparatus 4 is constructed so that a plurality of input image data can be stored in addition to registration image data.

Figure 8:
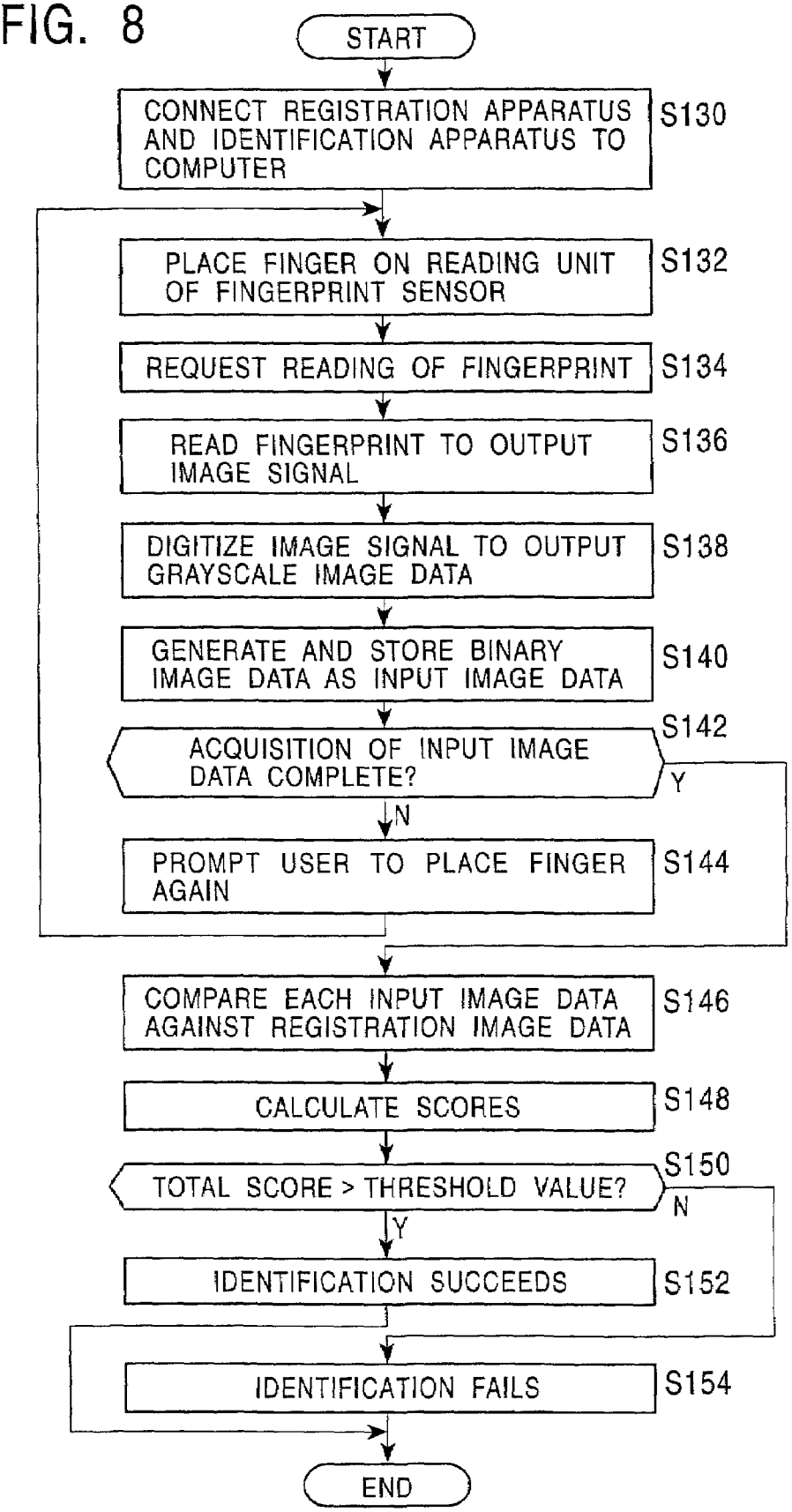
FIG. 8 is a flowchart of a fingerprint identification operation according to a second embodiment.

FIG. 8 is a flowchart of an operation for identifying a fingerprint according to the second embodiment.

When identifying a fingerprint, the identification apparatus 4 is connected to the computer 24 via the USB cable 28 (step S130), as shown in FIG. 3.

Then, a person who is to input his/her fingerprint places his/her finger on the reading unit 301 of the fingerprint sensor 30 (step S132). An operator of the computer 24 performs a predetermined operation on the computer 24, requesting the identification apparatus 4 to read the fingerprint (step S134).

Thus, the fingerprint sensor 30 reads the fingerprint of a part of the finger placed on the reading unit 301, outputting an image signal representing the fingerprint (step S136). The A/D converter 12 digitizes the image signal to output gray-scale image data (step S138).

The fingerprint identification circuit 32 binarizes the grayscale image data received from the A/D converter 12, thus generating binary image data which serves as input image data representing the fingerprint, and stores the input image data in the image memory 16 (step S140). The image represented by the input image data shows only a portion of the fingerprint, as shown in FIG. 4A, similarly to the first embodiment.

The CPU 18 determines whether the number of input image data stored in the image memory 16 has reached a predetermined number (e.g., three times in this embodiment), i.e., whether the predetermined number of input image data has been acquired (step S142).

If step S142 evaluates to "N", the CPU 18 transmits to the computer 24 information for prompting the user to place his/her finger again on the fingerprint sensor 30, whereby the computer 24 prompts the user to place his/her finger again, for example, by displaying a message (step S144). Then, the process returns to step S132, and the same steps are repeated.

On the other hand, if step S142 evaluates to "Y", the fingerprint identification circuit 32 reads the registration image data which has been stored in advance in the image memory 16 and the plurality of input image data, and performs identification by pattern matching (step S146).

Figure 9:
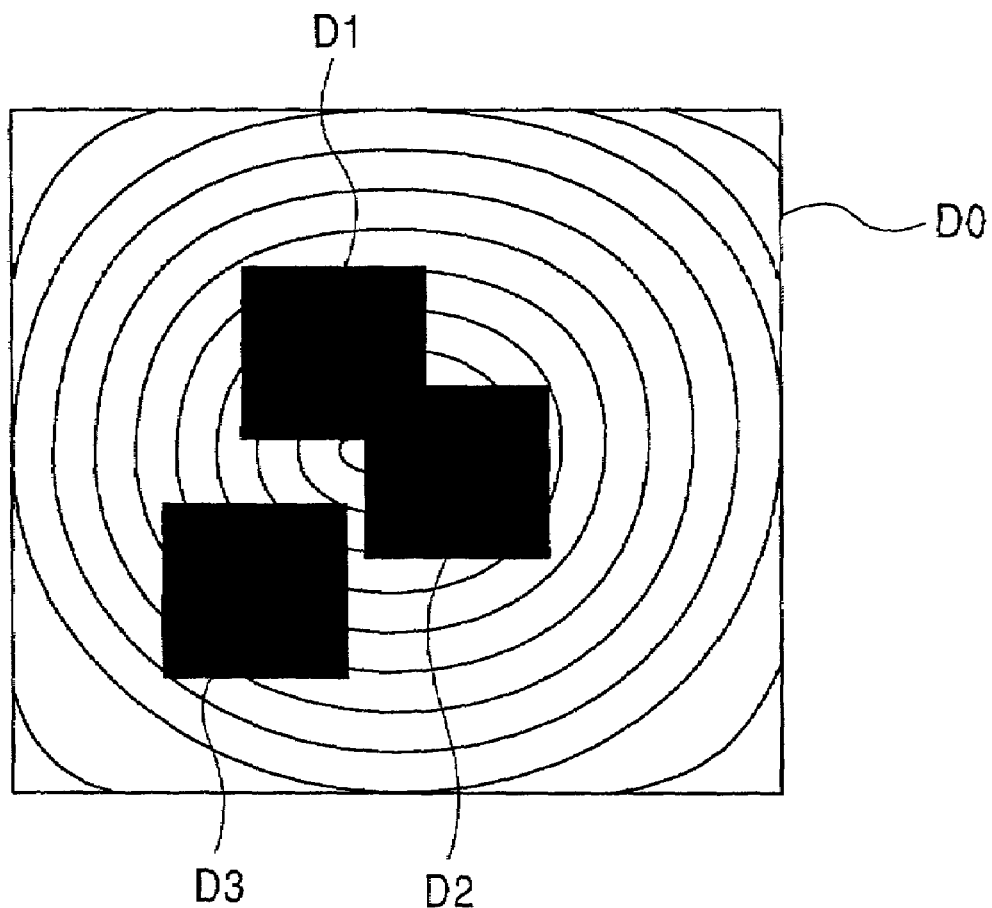
FIG. 9 is an illustration of images represented by binary image data stored in an image memory.

FIG. 9 is an illustration showing images represented by the registration image data and the plurality of input image data stored in the image memory 16.

As shown in FIG. 9, with respect to the image represented by the registration image data DO, the images represented respectively by the plurality (three in this embodiment) of input image data D1, D2, and D3 are located at different positions. This is because the position of the finger with respect to the fingerprint sensor 30 varies each time the finger is placed for the fingerprint to be read.

Then, scores of coincidence indicating the results of pattern matching between the registration image data and each of the input image data are calculated (step S148), and it is determined whether the total score exceeds a predetermined threshold value (step S150).

The threshold value is set to a value such that it is accurately determined that input image data matches registration image data when the total score exceeds the threshold value.

If step S150 evaluates to "Y", identification ends in success. If step S150 evaluates to "N", identification ends in failure.

The second embodiment achieves the same operation and advantages as the first embodiment, and in addition, is advantageous in improving accuracy of fingerprint identification because a plurality of input image data is compared against registration image data.

In the second embodiment, scores indicating coincidence between the registration image data and each of the input image data are calculated, and it is determined whether the input image data coincides with the registration image data based on whether the total score exceeds a predetermined threshold value. Alternatively, whether the input image data coincides with the registration image data may be determined by comparing each of the scores with a predetermined threshold value and based on whether the individual scores exceed the threshold value more often than a predetermined number of times.

Next, a third embodiment will be described.

In the third embodiment, an identification apparatus is implemented in the form of a wristwatch.

Figure 10:
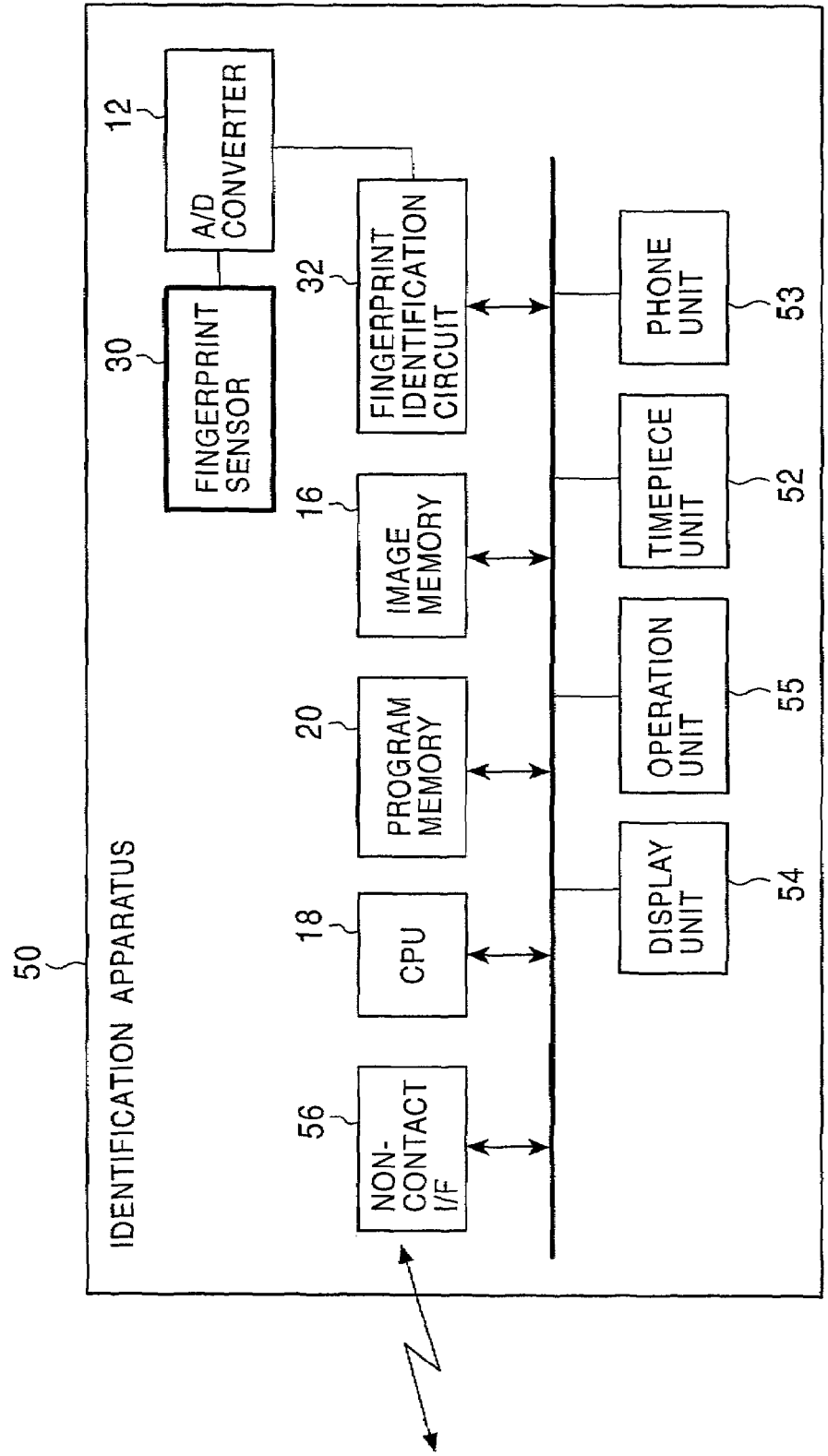
FIG. 10 is a block diagram showing the construction of an identification apparatus according to a third embodiment.
Figure 11A:
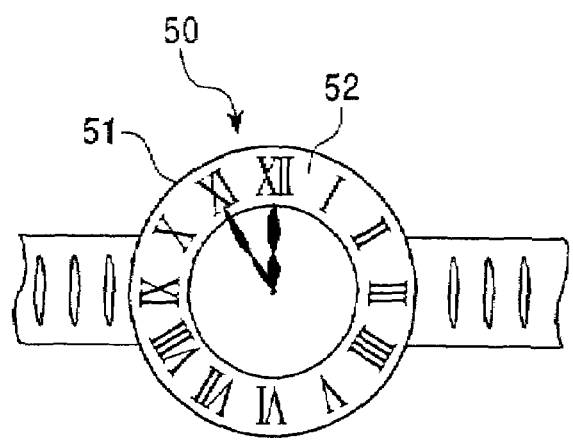
FIG. 11A is an external view of the identification apparatus according to the third embodiment.
Figure 11B:
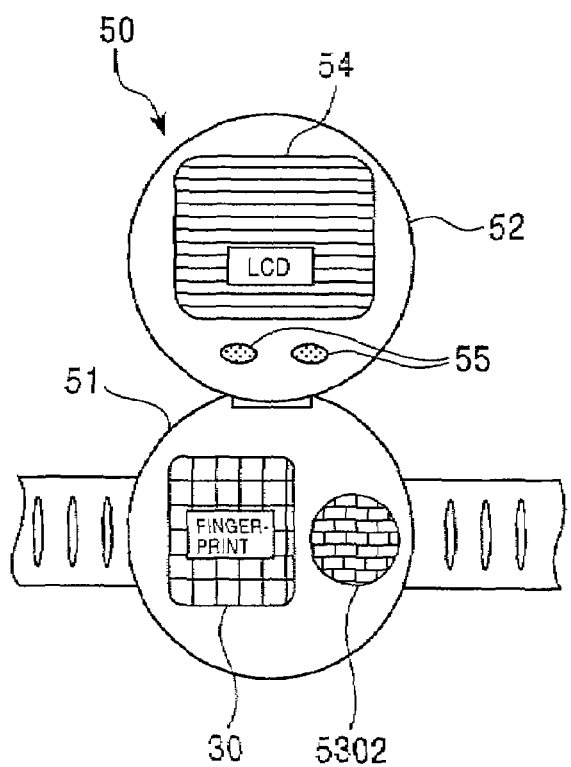
FIG. 11B is an external view thereof with a fingerprint sensor exposed.

FIG. 10 is a block diagram showing the construction of an identification apparatus according to the third embodiment. FIG. 11A is an external view of the identification apparatus, and FIG. 11B is an external view thereof in which a fingerprint sensor is exposed. FIG. 12 is a diagram showing the configuration of a fingerprint identification system according to the third embodiment. Parts that are identical to those in the first embodiment are designated by the same numbers.

As shown in FIGS. 11A and 11B, an identification apparatus 50 is implemented in the form of a wristwatch (an example of portable item in Claims). The identification apparatus 50 includes a main unit 51, and a timepiece unit 52 which can be opened and closed by a hinge with respect to the top surface of the main unit 51.

When the timepiece unit 52 is closed with respect to the main unit 51, the top surface of the main unit 51 is covered by the bottom surface of the timepiece unit 52 and the timepiece unit 52 faces outward; whereas when the timepiece unit 52 is opened with respect to the main unit 51, the top surface of the main unit 51 faces outward.

On the top surface of the main unit 51, a fingerprint sensor 30 and a microphone/speaker 5302 are provided. On the bottom surface of the timepiece unit 52, a display unit 54 implemented by an LCD and an operation unit 55 having operation buttons are provided.

As shown in FIG. 10, the identification apparatus 50 includes an A/D converter 12, an image memory 16, a CPU 18, a program memory 20, the fingerprint sensor 30, and a fingerprint identification circuit 32, which are similar to the first embodiment and whose descriptions will be omitted.

The identification apparatus 50, in addition to the above construction, includes the timepiece unit 52, the display unit 54, the operation unit 55, and furthermore, a phone unit 53 and a non-contact interface 56.

The timepiece unit 52 shows time. The display unit 54 is controlled by the CPU 18 so as to display characters, symbols, etc.

The phone unit 53 includes the microphone/speaker 5302, and has functionality equivalent to that of a cellular phone.

The operation unit 55 is used to perform operations required in operation of the identification apparatus 50.

The non-contact interface 56 serves to exchange information using, for example, infrared signals or radio signals, bilaterally with a non-contact interface 62 provided in a computer 60 which is equivalent to the computer 24 in the first embodiment.

In this embodiment, the CPU 18 operates based on programs stored in the program memory 20 so that the display unit 54, the operation unit 55, a memory which is not shown, etc. cooperate to function, for example, as an electronic notebook or a PDA.

Figure 13:
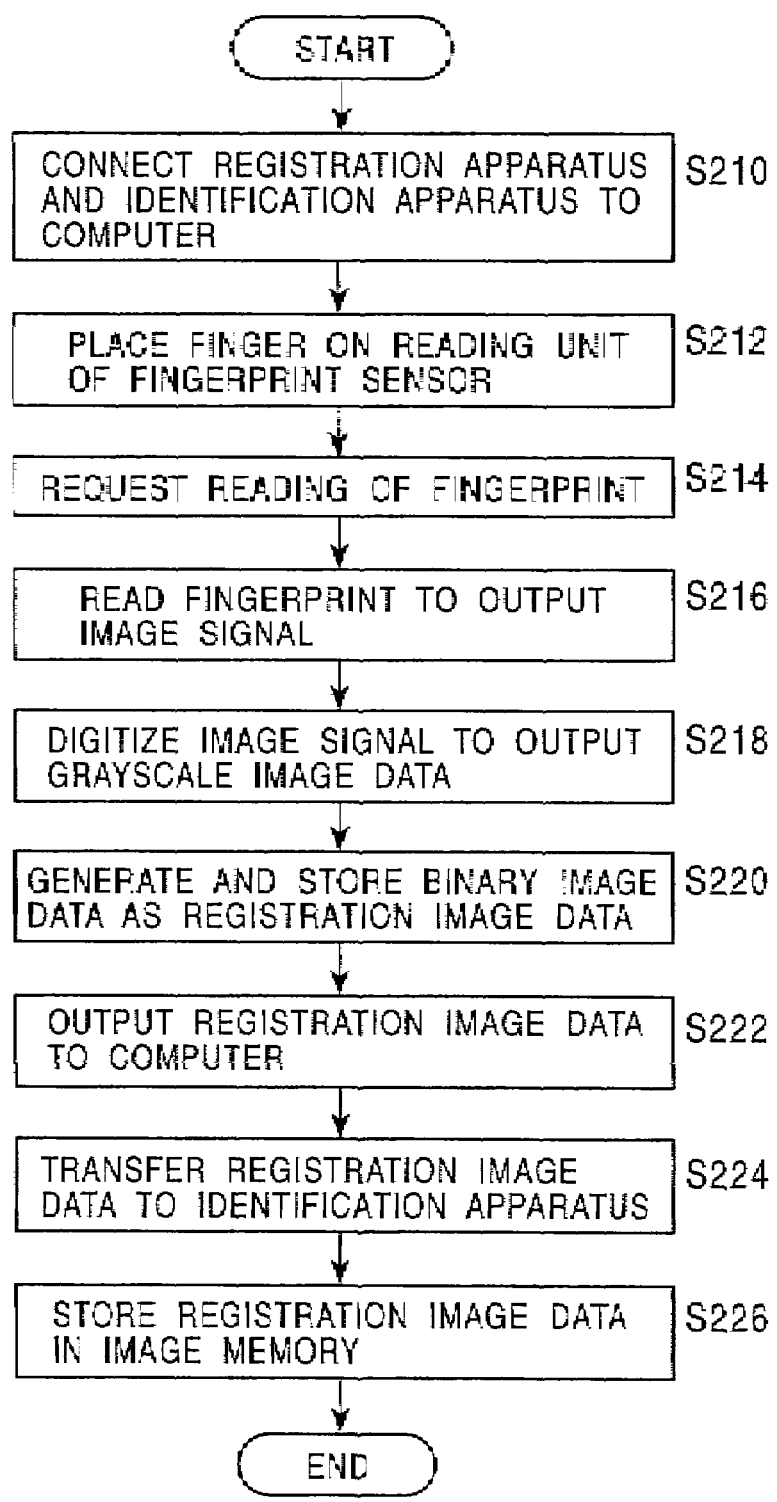
FIG. 13 is a flowchart of a fingerprint registration operation according to the third embodiment.

Next, the operation of a fingerprint identification system using the identification apparatus 50 will be described with reference to a flowchart shown in FIG. 13.

When registering a fingerprint, the registration apparatus 2 is connected to the computer 60 via the USB cable 28, and the identification apparatus 50 is allowed to communicate with the computer 60 via the non-contact interface 56 and the non-contact interface 62 (step S210), as shown in FIG. 12.

Then, in the registration apparatus 2, a person who is to register his/her fingerprint places his/her finger on the reading unit 108 of the fingerprint sensor 104 (step S212). An operator of the computer 60 performs a predetermined operation on the computer 60, requesting the registration apparatus 2 to read the fingerprint (step S214).

Thus, the fingerprint sensor 104 reads the fingerprint of substantially the entire finger placed on the reading unit 108, and outputs an image signal representing the fingerprint (step S216). The A/D converter 12 (shown in FIG. 1A) digitizes the image signal to output grayscale image data (step S218).

The fingerprint registration circuit 14 binarizes the grayscale image data received from the A/D converter 12, thus generating binary image data which serves as registration image data of the fingerprint, and stores the registration image data in the image memory 16 (step S220). The image represented by the registration image data stored in the image memory 16 is, for example, as shown in FIG. 4B.

Then, the CPU 18 reads the registration image data of the fingerprint from the image memory 16 and outputs the registration image data to the computer 60 via the USB controller 26 and the USB cable 28 (step S222). The computer 60 transfers the registration image data to the identification apparatus 50 via the non-contact interface 62 and the non-contact interface 56 (step S224).

The CPU 18 of the identification apparatus 50 receives the registration image data via the non-contact interface 62 and the non-contact interface 56 and stores the registration image data in the image memory 16 (step S226).

Figure 14:
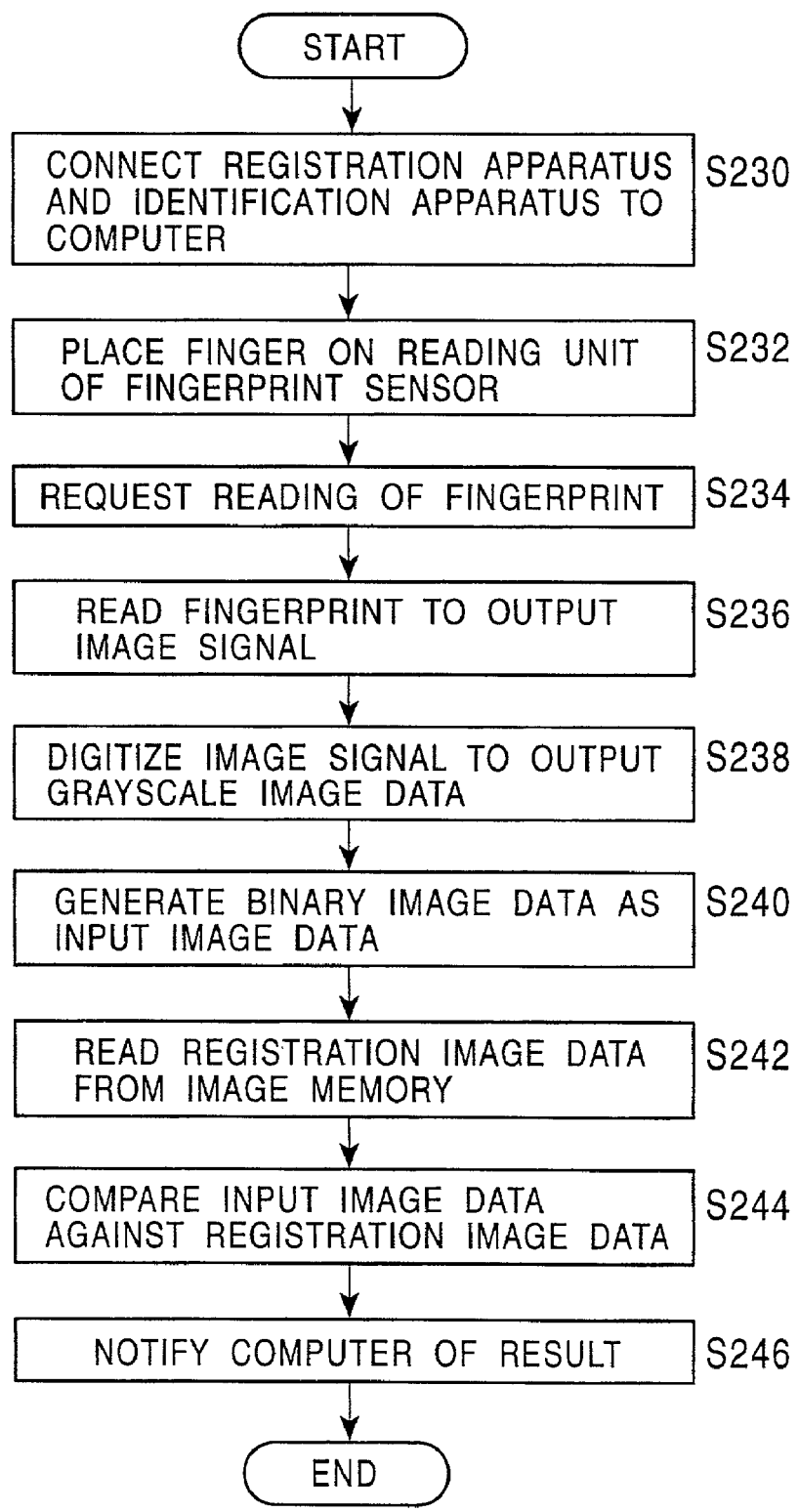
FIG. 14 is a flowchart of a fingerprint identification operation according to the third embodiment.
Figure 15:
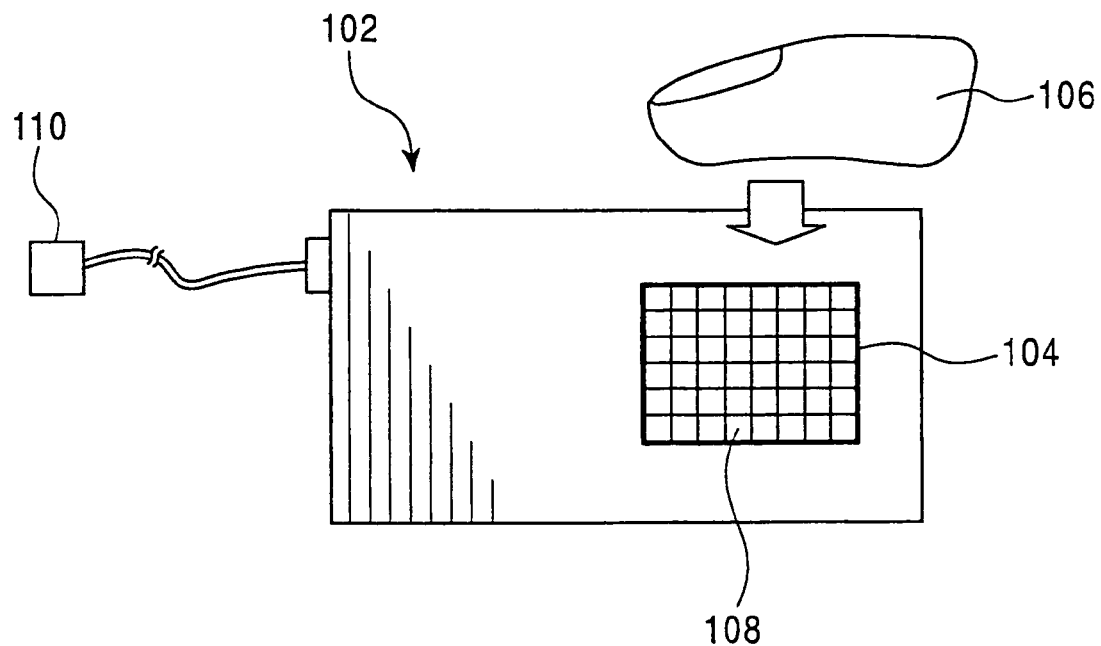
FIG. 15 is an external view of an example of conventional fingerprint identification apparatus.
Figure 16A:
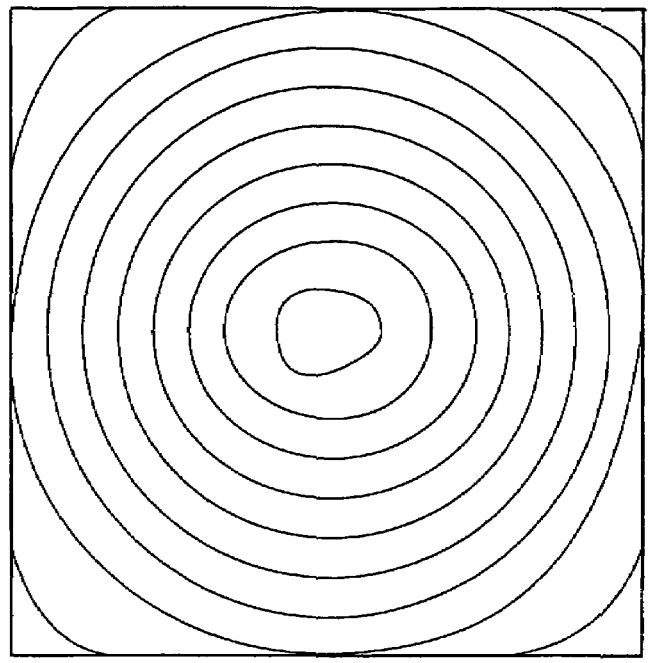
FIGS. 16A and 16B are illustrations showing examples of fingerprint images represented by binary image data generated in the conventional fingerprint identification apparatus.
Figure 16B:
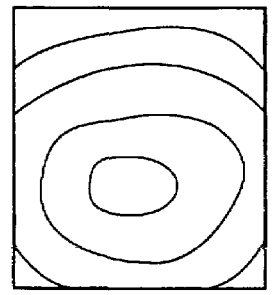

Next, an operation for identifying a fingerprint will be described with reference to a flowchart shown in FIG. 14.

When identifying a fingerprint, the identification apparatus 50 is allowed to communicate with the computer 60 via the non-contact interface 56 and the non-contact interface 62 (step S230), as shown in FIG. 3.

Then, a person who is to input his/her fingerprint places his/her finger on the reading unit 301 of the fingerprint sensor 30 (step S232). An operator of the computer 60 performs a predetermined operation on the computer 60, requesting the identification apparatus 4 to read the fingerprint (step S234).

Thus, the fingerprint sensor 30 reads the fingerprint of a portion of the finger placed on the reading unit 301, outputting an image signal representing the fingerprint (step S236). The A/D converter 12 digitizes the image signal to output grayscale image data (step S238).

The fingerprint identification circuit 32 binarizes the grayscale image data received from the A/D converter 12, thus generating binary image data which serves as input image data of the fingerprint (step S240). The image represented by the input image data generated by the fingerprint identification circuit 32 based on the data from the A/D converter 12 shows only a portion of the fingerprint, as shown in FIG. 4A.

The fingerprint identification circuit 32 reads the registration image data which has been stored in the image memory 16 as described earlier (step S242). The fingerprint identification circuit 32 then compares, by pattern matching, the input image data which has been newly generated based on the data from the A/D converter 12 against the registration image data which has been read, thereby determining whether the fingerprints represented by the respective image data coincide with each other on the basis of a predetermined criterion (step S244).

The input image data represents only a portion of the fingerprint as described earlier (shown in FIG. 4A), whereas the registration image data stored in the image memory 16 represents substantially the entire fingerprint (shown in FIG. 4B); thus, the fingerprint identification circuit 32 performs pattern matching while moving the position of the image represented by the input image data over the entire image represented by the registration image data.

The CPU 18 is notified of the identification result via the bus line 22, and the CPU 18 notifies the computer 60 of the identification result via the non-contact interface 56 and the non-contact interface 60 (step S246).

According to the third embodiment described above, the same operation and advantages are achieved. In addition, the identification apparatus is implemented in the form of a wristwatch, which can be constantly carried; thus, the identification apparatus is small in size and portable, readily allowing fingerprint identification anytime and anywhere. This serves to improve convenience of personal authentication. Furthermore, the reduced size of the identification apparatus advantageously serves to reduce cost.

Furthermore, comparison of the input image data against the registration image data may be performed in a manner similar to the second embodiment.

Furthermore, similarly to the first embodiment, the registration image data generated by the registration apparatus 2 may be encrypted before being output to the computer 60, and in the identification apparatus 50, the registration image data may be encrypted before being stored in the image memory 16, which serves to enhance security.

Furthermore, although the computer 60 is used as an apparatus for forwarding the result of identification by the identification apparatus 50 in the third embodiment, the present invention may be applied to various cases where fingerprint identification is required, including the following examples:

1) In a locking system for locking a door to a home, the door is unlocked based on the result of fingerprint identification by the identification apparatus 50.

2) In a television broadcast which allows bilateral communications or in a system for stock trading over the Internet, confirmation of stock trades is performed based on the result of fingerprint identification by the identification apparatus 50.

3) In a system for controlling a private car, the door is unlocked and the engine is started based on the result of fingerprint identification by the identification apparatus 50.

4) When accessing an office LAN from a terminal apparatus such as a notebook computer, access to the LAN is permitted based on the result of fingerprint identification by the identification apparatus 50.

5) In an office time recorder, arrival time is recorded based on the result of fingerprint identification by the identification apparatus 50.

6) When activating an office computer, activation of the computer is permitted based on the result of fingerprint identification by the identification apparatus 50.

7) In a system for filing or approving documents, documents are filed or approved based on the result of fingerprint identification by the identification apparatus 50.

8) When shopping on a credit card, transaction is settled based on the result of fingerprint identification by the identification apparatus 50.

9) In a system for reserving tickets for entertainment events such as concerts, reservation is made based on the result of fingerprint identification by the identification apparatus 50.

Furthermore, an identification apparatus according to the present invention may be incorporated in a telephone card, a credit card, a cash card, a card to be used in an ATM of a bank, a ticket or commutation ticket for various public transportation services, a passport, a driving license, an insurance card, etc. as well as in a smart card (IC card) and a wristwatch as described earlier.

In the embodiments described above, the registration apparatus and the identification apparatus are connected to a computer via USB cables; however, alternatively, the connection may be formed using other types of wires or by wireless, with any type of suitable interfaces.

Furthermore, although image data is transferred from the registration apparatus to the identification apparatus via a computer, the registration apparatus and the identification apparatus may be directly connected without a computer in the middle so that image data will be directly transferred.

The fingerprint sensor is not limited to the type which detects capacitance, and may be, for example, an optical type using CCD. When an optical fingerprint sensor is used, an identification apparatus can be readily incorporated in various portable items mentioned earlier by reducing the size of the optical system so that fingerprint identification is allowed whenever required, similarly to the embodiments described above in which the size of the fingerprint sensor in the identification apparatus is reduced. Furthermore, cost can be reduced by using a CMOS sensor with a smaller number of elements as the fingerprint sensor of the identification apparatus.

In the embodiments described above, fingerprint is used as information relating to biometric features of an individual user, i.e., biometric information which can be read from the body of the user; however, as an alternative to fingerprint, for example, retina or iris may be used as biometric information.

When retina is used, a pattern of blood vessels which appear on retina at the back of an eye is read. Iris is thin-film tissue for coordinating contraction and expansion of pupil of an eye, whose pattern is unique to each individual. The pattern becomes stable in two years after birth, and then remains unchanged over one's lifetime. Furthermore, iris is so complex that it differs among people who share the same relevant genes.

A biometric sensor for reading biometric information can be implemented by a known type. For example, as a biometric sensor for reading retina, the type which irradiates retina with light from outside, such as a fundus photography apparatus, can be used.

When biometric information is used as described above, a biometric identification apparatus can be implemented similarly to the embodiments described above, achieving the same operation and advantages.

What is claimed is:

1. A fingerprint identification system comprising:
a timepiece unit; and
a main unit,
wherein said timepiece unit is swingably connected to said main unit through a hinge,
said main unit comprising:
    a registration apparatus; and
    an identification apparatus,
    wherein both of said registration apparatus and said identification apparatus are covered by a bottom surface of said timepiece,
    said registration apparatus comprising:
        a first fingerprint sensor for reading a fingerprint in a first region of a human finger to output a first image signal representing an image of the fingerprint;
        first image data generating means for generating first image data of the fingerprint based on the first image signal output from said first fingerprint sensor; and
        data output means for outputting the first image data generated by said first image data generating means;
    said identification apparatus comprising:
        data input means for receiving the first image data output from said data output means;
        storage means for storing the first image data received by said data input means;
        a second fingerprint sensor for reading a fingerprint in a second region of a human finger, which is smaller than said first region, to output a second image signal representing an image of the fingerprint;
        second image data generating means for generating second image data of the fingerprint based on the second image signal output from said second fingerprint sensor; and
        image identification means for comparing the second image data generated by said second image data generating means against the first image data stored in said storage means to determine whether the fingerprints represented by the first and second image data, respectively, coincide with each other.

2. The fingerprint identification apparatus according to claim 1, wherein said first fingerprint sensor generates the first image signal by detecting variation in capacitance due to ridges and valleys of the fingerprint when the finger is placed on a fingerprint reading unit.

3. The fingerprint identification apparatus according to claim 1, wherein said image data generating means generates first image data representing a binary image of the fingerprint based on the first image signal output from said fingerprint sensor.

4. The fingerprint identification apparatus according to claim 1, wherein said image identification means compares the second image data generated by said second image data generating means against the first image data stored in said storage means by pattern matching to determine whether the fingerprints represented by the first and second image data, respectively, coincide with each other.

5. The fingerprint identification apparatus according to claim 1, wherein said second fingerprint sensor reads the fingerprint a plurality of times with the finger placed at different positions with respect to said second fingerprint sensor so that said second image data generating means generates a plurality of image data of the fingerprint, and said image identification means compares each of the plurality of image data generated by said second image data generating means against the first image data stored in said storage means to calculate scores each score indicating the degree of coincidence between the first and second image data, thereby determining whether the fingerprints represented by the first and second image data coincide with each other based on the scores.

6. The fingerprint identification apparatus according to claim 5, wherein said image identification means determines coincidence based on a comparison of the total of the scores with a predetermined threshold value.

7. The fingerprint identification apparatus according to claim 5, wherein said image identification means determines coincidence based on individual comparisons of each of the scores with a predetermined threshold value.

8. A fingerprint identification method comprising, a timepiece unit and a main unit, said main unit having a registration apparatus and an identification apparatus, the method comprising the steps of:
swinging said timepiece unit about a hinge so that said registration apparatus and said identification apparatus of said main unit are exposed;
controlling said registration apparatus through the steps of:
    a first image signal output step for reading a fingerprint in a first region of a human finger by a first fingerprint sensor to output a first image signal representing a first image of the fingerprint;
    a first image data generating step for generating first image data of the fingerprint based on the first image signal output in said first image signal output step; and a data output step for outputting the first image data generated in said first image data generating step;

controlling said identification apparatus through the steps of:

a data input step for receiving the first image data output in said data output step;

storing the first image data received in said data input step in storage means;

a second image signal output step for reading a fingerprint in a second region of a human finger, which is smaller than said first region, by a second fingerprint sensor to output a second image signal representing a second image of the fingerprint;

a second image data generating step for generating second image data of the fingerprint based on the second image signal output in said second image signal output step; and an image identification step for comparing the second image data generated in said second image data generating step against the first image data stored in said storage means to determine whether the fingerprints represented by the first and second image data, respectively, coincide with each other.

9. A fingerprint identification method according to claim 8, wherein the fingerprint is read in said second image signal output step a plurality of times with the finger placed at different positions with respect to said fingerprint sensor so that a plurality of image data of the fingerprint is generated in said second image data generating step, and in said image identification step, each of the plurality of image data generated in said second image data generating step is compared against the first image data stored in said storage means to calculate scores each indicating the degree of coincidence between the first and second image data, thereby determining whether the fingerprints represented by the first and second image data coincide with each other based on the scores.

10. A biometric identification apparatus comprising:

a timepiece unit; and a main unit, wherein said timepiece unit is swingably attached to said main unit through a hinge, said main unit comprising:

storage means for storing first image data representing a first image of biometric information in a first region of a human body;

a biometric sensor for reading biometric information in a second region of a human body, which is smaller than said first region, to output an image signal representing a second image of the biometric information;

image data generating means for generating second image data of the biometric information based on the image signal output from said biometric sensor; and image identification means for comparing the second image data generated by said image data generating means against the first image data stored in said storage means to determine whether the biometric information represented by the first and second image data, respectively, coincide with each other.

11. The biometric identification apparatus according to claim 10, wherein said image data generating means generates second image data representing a binary image of the biometric information based on the image signal output from said biometric sensor.

12. The biometric identification apparatus according to claim 10, wherein said image identification means compares the second image data generated by said image data generating means against the first image data stored in said storage means by pattern matching to determine whether the biometric information represented by the first and second image data, respectively, coincide with each other.

13. The biometric identification apparatus according to claim 10, wherein said biometric sensor reads the biometric information a plurality of times with the relevant part of the human body placed at different positions with respect to said biometric sensor so that said image data generating means generates a plurality of second image data of the biometric information, and said image identification means compares each of the plurality of second image data generated by said image data generating means against the first image data stored in said storage means to calculate scores each score indicating the degree of coincidence between the first and second image data, respectively, thereby determining whether the biometric information represented by the first and second image data coincide with each other based on the scores.

14. The biometric identification apparatus according to claim 13, wherein said image identification means determines coincidence based on a comparison of the total of the scores with a predetermined threshold value.

15. The biometric identification apparatus according to claim 13, wherein said image identification means determines coincidence based on individual comparisons of each of the scores with a predetermined threshold value.

* * * * *